(12) United States Patent
Zibuschka et al.

(10) Patent No.: US 12,095,928 B2
(45) Date of Patent: Sep. 17, 2024

(54) TECHNIQUES FOR UPDATING A SOFTWARE COMPONENT

(71) Applicant: Robert Bosch GmbH, Stuttgart (DE)

(72) Inventors: Jan Zibuschka, Magstadt (DE); Paulius Duplys, Markgroeningen (DE); Robert Szerwinski, Nufringen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 307 days.

(21) Appl. No.: 17/650,895

(22) Filed: Feb. 14, 2022

(65) Prior Publication Data

US 2022/0263662 A1     Aug. 18, 2022

(30) Foreign Application Priority Data

Feb. 18, 2021    (DE) ...................... 10 2021 201 572.7

(51) Int. Cl.
*H04L 9/32*       (2006.01)
*G06F 8/65*       (2018.01)
*H04L 9/08*       (2006.01)

(52) U.S. Cl.
CPC .............. *H04L 9/3247* (2013.01); *G06F 8/65* (2013.01); *H04L 9/085* (2013.01); *H04L 9/0852* (2013.01)

(58) Field of Classification Search
CPC .......... H04L 9/3247; H04L 9/085; G06F 8/65
USPC .......................................................... 713/168
See application file for complete search history.

(56) References Cited

U.S. PATENT DOCUMENTS

2018/0302385 A1*   10/2018   Wysocki ............. H04L 63/0435
2021/0119789 A1*   4/2021   Ghosh .................. H04L 9/0643

* cited by examiner

*Primary Examiner* — Jeffrey C Pwu
*Assistant Examiner* — Samuel Ambaye
(74) *Attorney, Agent, or Firm* — NORTON ROSE FULBRIGHT US LLP; Gerard A. Messina

(57) ABSTRACT

A method for updating a software component. The method includes providing a first electronic device and a second electronic device that are connected in a first network, receiving update information for the second electronic device via the first electronic device, the update information being provided with a signature that is generated with the aid of a post-quantum algorithm (PQA) signature, checking the update information by validating the signature by the first electronic device, relaying the update information to the second electronic device if the update information is deemed to be valid, and updating a software component of the second electronic device using the update information.

13 Claims, 4 Drawing Sheets

TECHNIQUES FOR UPDATING A SOFTWARE COMPONENT

CROSS REFERENCE

The present application claims the benefit under 35 U.S.C. § 119 of German Patent No. DE 10 2021 201 572.7 filed on Feb. 18, 2021, which is expressly incorporated herein by reference in its entirety.

FIELD

The present invention relates to techniques for updating a software component, in particular a firmware component of a control unit of a device.

BACKGROUND INFORMATION

The updating of software components is necessary or at least desirable in increasingly more applications. In some technical environments, this may create problems for software components, which in particular are to be attributed to limitations in the performance of the devices in these environments. Thus, in many applications such as automobiles, household appliances, and industrial facilities, software components are used in control units or other hardware environments that are designed for a specific task and often provided with only limited capability. Traditionally, such devices have not been updateable or have been updateable only with considerable effort (for example, by replacing a physical component). Even if the updating of a software component were possible for such devices via a network (and therefore with less effort), further difficulties may still arise. In particular, the methods for validating update information (i.e., using objective criteria to check whether the update information at a certain point in time is to be used for updating a software component, in particular, whether the update information originates from a predetermined and/or trustworthy source) become increasingly more complex. This applies in particular for algorithms (post-quantum algorithms) whose security, due to the continuing development of quantum computers, is not (significantly) weakened. In many common asymmetrical signature methods and/or encryption methods, the asymmetrical character is made possible by the use of computation rules, which although in particular for conventional computers they are virtually irreversible and may thus be "hacked," with significantly greater effort they may be reversed using quantum computers. (An important example is prime factorization, on which conventional signature methods and/or encryption methods are based, and for which, using Shor's algorithm, a highly efficient algorithm for quantum computers exists, with the aid of which a (long) prime number may be quickly factored.) Due to their complexity, post-quantum algorithms are difficult to implement on conventional control units in automobile or in household appliances, for example. The techniques of the present invention deal with this problem.

SUMMARY

A first general aspect of the present invention relates to a method for updating a software component. In accordance with an example embodiment of the present invention, the method includes providing a first electronic device and a second electronic device, which are connected in a first network, receiving update information for the second electronic device via the first electronic device, the update information being provided with a signature that is generated with the aid of a post-quantum algorithm (PQA) signature, checking the update information by validating the signature by the first electronic device, relaying the update information to the second electronic device if the update information is deemed to be valid, and updating a software component of the second electronic device, using the update information.

A second general aspect of the present invention relates to a system that includes a first and a second electronic device that are designed to carry out the method according to the first general aspect of the present invention.

The techniques of the first and second general aspects of the present invention may have one or multiple of the following advantages.

First, in some situations the software of electronic devices which do not include the necessary hardware resources for validating PQA signatures may also be updated using PQA signatures. The first electronic device (for example, a mobile telephone or laptop with sufficient capability) may take over the validation, which may possibly be computationally complicated, and relay only validated update information to the second electronic device (for example, a control unit of a household appliance).

Second, as a result, in some situations the second electronic devices may be equipped with less complex hardware and/or may be operated longer (without endangering their security). In some systems of the related art, the use of PQA signatures could necessitate a replacement of the second devices (for example, control units for functions of a vehicle or for a machine), since existing devices are not equipped with sufficiently powerful hardware resources. This may be unfavorable, in particular for potentially long-lasting systems such as automobiles or industrial machines.

Third, the method may allow greater agility in the use of validation algorithms, since a first electronic device, using the techniques of the present invention, may be more easily designed with a functionality for replacing a first validation algorithm by a second validation algorithm. In other words, the communication between the first and the second electronic device (for example, within a vehicle electrical system network) may remain unchanged over the service life of the vehicle, while the first device uses up-to-date validation algorithms on an ongoing basis.

Several terms are used in the following way in the present disclosure: An "electronic device" in the present disclosure includes its own hardware resources, which include at least one processor for executing commands and a memory for storing at least one software component. The term "processor" also encompasses multicore processors or multiple separate components which take over the tasks of a central processing unit of an electronic device (and optionally share same). An electronic device may independently carry out tasks (measuring tasks, monitoring tasks, control tasks, or other work tasks, for example). However, in some examples an electronic device may also be controlled by some other device. An electronic device may be physically delimited (with its own housing, for example) or may be integrated into a higher-order system. An electronic device may be an embedded system.

An "embedded system" is an electronic device that is integrated (embedded) in a technical context. In the process, the device takes over either monitoring, control, or regulation functions or is responsible for a form of data or signal processing, for example for encryption or decryption, encoding or decoding, or filtering.

A "(dedicated) control unit" is an electronic device that controls only one function of a system or of a device (a vehicle or a machine, for example). A control unit may control, for example, an electric household appliance or a component (an engine, for example) of a vehicle.

A "(digital) signature" is part of an asymmetrical encryption system, in which a sender with the aid of a piece of secret information (for example, a secret signature key, also referred to as a "private key") computes a piece of data, referred to as a signature, for arbitrary data (in the present disclosure, update information). This piece of data allows third parties, with the aid of public information (for example, a verification key, also referred to as a public key), to check authorship and/or integrity of the arbitrary data. To allow a signature that is created using secret information (a signature key, for example) to be associated with an author, the associated public information (a verification key, for example) must be unequivocally associated with this author.

The term "validation" describes a check of a signature with the aid of a predetermined algorithm (a computation rule, for example) in order to check the authorship and/or integrity of a message and the information contained therein.

In the present disclosure, a "post-quantum algorithm" or "PQA" is an algorithm that uses cryptographic primitives which are virtually undecryptable, even using presently available or proposed quantum computer designs (for example, an average computing time for the decryption is ten years or longer).

The term "software component" may in principle be any part of software of a device of the present disclosure. In particular, a software component may be a firmware component of an electronic device of the present disclosure.

The term "update information" encompasses any data that form, directly or according to appropriate processing steps, a software component of a device according to the present disclosure. The update information may contain executable code or code that is yet to be compiled.

"Firmware" is software that is embedded in (electronic) devices and performs basic functions there. Firmware is functionally permanently linked to the particular hardware of the device (so that one is not usable without the other). It may be stored in a nonvolatile memory such as a flash memory or an EEPROM.

DETAILED DESCRIPTION OF EXAMPLE EMBODIMENTS

The techniques for updating a software component according to the present invention and possible embodiments are initially described with reference to FIG. 1. Aspects of the electronic devices that are used in the techniques of the present invention are then explained in greater detail with reference to FIG. 2. Lastly, specific systems according to the present invention are discussed with reference to FIGS. 3 and 4.

Figure 1:
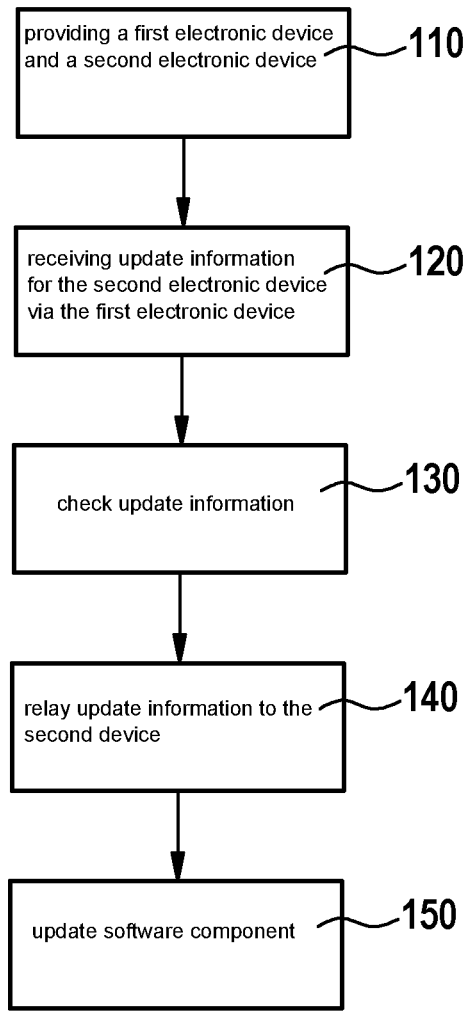
FIG. 1 illustrates the method for updating a software component according to an example embodiment of the present invention.

FIG. 1 shows a method for updating a software component. The method includes initially providing 110 a first electronic device and a second electronic device that are connected in a first network. The possible properties of the first and second electronic devices and of the first network are described in greater detail below.

The method further includes receiving 120 update information for the second electronic device via the first electronic device. The update information is provided with a signature that is generated with the aid of a post-quantum algorithm (PQA) signature. The update information may be transmitted from a data source (for example, a manufacturer of the second electronic device) via a second network (which is of a different type than the first network).

In some examples, the update information may contain a useful data portion which contains the information that forms, directly or according to appropriate processing steps, a software component of a device according to the present invention. The update information may also contain metadata (for example, author information about a source of the update information, version information about a version of a software component that pertains to the software update, and/or information that describes the nature or the objective of the software update). In some examples, the update information may contain elements that link it to one or multiple other (for example, earlier) versions of the software component to be updated. For example, this may be a piece of information (a value, for example) which, when it is processed using a cryptographic function (a hash function, for example), corresponds to a piece of information (a value, for example) contained in some other (for example, earlier) piece of update information.

The update information may contain pieces of information that identify a target device (i.e., the second device) and/or a class of target devices and/or a group of target devices.

The update information may be provided with one or multiple further signatures in addition to the PQA signature. The update information or a useful data portion of the update information may be encrypted with the aid of the PQA signature or a further signature. However, in other cases, it is possible that the update information or a useful data portion of the update information cannot be encrypted using the PQA signature.

The post-quantum algorithm (PQA) with which the PQA signature is generated may be an asymmetrical algorithm. For an asymmetrical algorithm, a validation (i.e., check) of the signature and optionally a decryption of encrypted data may be possible with the aid of public information (i.e., potentially for everyone).

For this purpose, a secret key may be used, and it must be virtually impossible to compute it from a public key. The public key may be made available to anyone who wants to send an encrypted message to the owner of the private key. It must be ensured that the public key is also actually associated with the recipient.

In some examples, the PQA signature may be a signature that is based on a hash value. In some examples, the hash value may be computed based on the update information or a portion of the update information. For example, the PQA signature may have been generated using an extended Merkle signature scheme (XMSS) algorithm. In another example, the PQA signature may be generated with the aid of a grid-based algorithm (for example, a Goldreich-Goldwasser-Halevi (GGH) algorithm or an NTRUSign algorithm). Further examples of PQA signatures may be generated based on multivariant polynomials (or the solution of these multivariant polynomials) or error-correcting codes. Further algorithms for generating a PQA signature are conventional to those skilled in the art.

The update information that is provided with the PQA signature may be part of a second (more comprehensive) piece of update information. Other portions of the second update information may be provided with further digital signatures, which may be PQA signatures or non-PQA signatures. In addition, the update information itself may be provided with further digital signatures, which may be PQA signatures or non-PQA signatures.

A further step includes checking 130 the update information by validating the signature by the first electronic device. In some cases, the first device may carry out the validation without hardware acceleration (i.e., without the use of specialized hardware for validating a digital signature). This may take place using a processor and volatile memory of the first electronic device (the hardware of the first electronic device is discussed in greater detail below with reference to FIG. 2). In other examples, the first electronic device may use specialized hardware for validating the PQA signature, which in some cases may provide hardware acceleration and/or store cryptographic keys (a trusted system or a virtual trusted system, for example). The operations to be carried out for validating the PQA signatures are a function of the particular PQA used, and are conventional to those skilled in the art.

When a piece of update information is deemed to be invalid, a corresponding message may be sent to the source of the update information.

The method includes relaying 140 the update information to the second electronic device if the update information is deemed to be valid.

In some examples, the PQA signature may be removed from the first electronic device (before the update information is relayed to the second electronic device). If the update information or a useful data portion of the update information is encrypted with the aid of the PQA signature or a further signature, the first electronic device may remove this encryption. In some examples, the first device may apply a new or a further encryption to the update information or a useful data portion of the update information.

The update information relayed by the first electronic device may be received by the second electronic device. A software component of the second electronic device may be updated 150 using the update information.

The second electronic device may carry out further validation steps before the software component is updated. In some cases, the second electronic device may validate one or multiple further signatures of the update information (and may use the update information only for updating when it has been found to be valid based on the one or multiple further signatures). The one or multiple further signatures may be non-PQA signatures.

For validating the signatures of the update information, the second electronic device may use a trusted system (which in some cases may provide hardware acceleration and/or store cryptographic keys).

In some cases, the second electronic device may check version information of the update information (and may update the software component with the aid of the update information only if the version information indicates valid update information for a present configuration of the software component). For example, the second electronic device may check whether the update information pertains to a version of one of its software components that has not already been updated, and/or whether there are further versions between a present configuration of the software component and a configuration according to the update information.

In some cases, the update information may contain a firmware update for the second electronic device. The update information may contain executable code for the second electronic device.

In some examples, the method for updating a software component may include one or multiple of the following additional steps.

The first electronic device may be paired with the second electronic device (i.e., information allowing further communication has been exchanged between the first and the second electronic device within the scope of a previous communication). In some examples, the first electronic device and the second electronic device may share a cryptographic shared secret. The cryptographic shared secret may, for example, be a cryptographic key or a piece of identification information for the first or second device (a device ID and/or a serial number, for example). The relaying of the update information to the second electronic device may take place using the cryptographic shared secret. For example, the first electronic device may add to the update information the identification data for the first electronic device, which has been generated with the aid of the cryptographic shared secret. In other examples or in addition, the update information or a portion thereof may be encrypted with the aid of the cryptographic shared secret. Pairing the first electronic device and the second electronic device may in some cases facilitate the association of the update information with a specific second electronic device and/or enhance security of the communication within the first network.

In further examples, the post-quantum algorithm may be a first post-quantum algorithm, and the techniques may also include receiving update information for the first electronic device. The update information may include pieces of information that enable the first electronic device to validate a signature of a second post-quantum algorithm that differs from the first post-quantum algorithm. The technique may also include updating the first electronic device with the aid of the update information for the first electronic device.

A device that is updated in this way may then once again use the techniques of the present invention in order to validate update information for the second electronic device (a PQA signature, for example) and relay it to the second electronic device.

In some examples, the method may include receiving further update information for the second electronic device via the first electronic device. The update information may be provided with a signature that is generated with the aid of the second post-quantum algorithm (PQA). In addition, the first electronic device may check the further update information by validating the signature, and relaying the further update information to the second electronic device if the update information is deemed to be valid. The second electronic device may be updated using the further update information. The first electronic device may be repeatedly updated to allow further signatures to be validated.

In this way, in some cases the second electronic devices may be "externally" protected (i.e., with regard to the world outside the first network) by up-to-date security features without having to continually adapt the second electronic device and in particular its hardware to new algorithms (which in some cases would be associated with a replacement of the second electronic device or its components). Thus, in some cases the complexity of the second electronic device may be reduced and/or the (secure) service life thereof may be prolonged.

In the preceding paragraphs, the techniques of the present invention have been described with regard to a single second electronic device. In some cases, multiple "second" or "further" electronic devices may also be present in the first network (i.e., the second electronic device and further electronic devices are connected), whose software components are updated as described herein.

In one example, the first device is connected to at least one further electronic device in the first network, and the method includes updating a software component of the at least one further device, using the techniques according to the present invention.

In some examples, the first electronic device may check for which of the second electronic device and the at least one further electronic device update information is intended, and may relay the particular update information to the intended device.

Moreover, the present invention relates to an electronic device that is designed to carry out the steps pertaining to the first electronic device.

Figure 2:
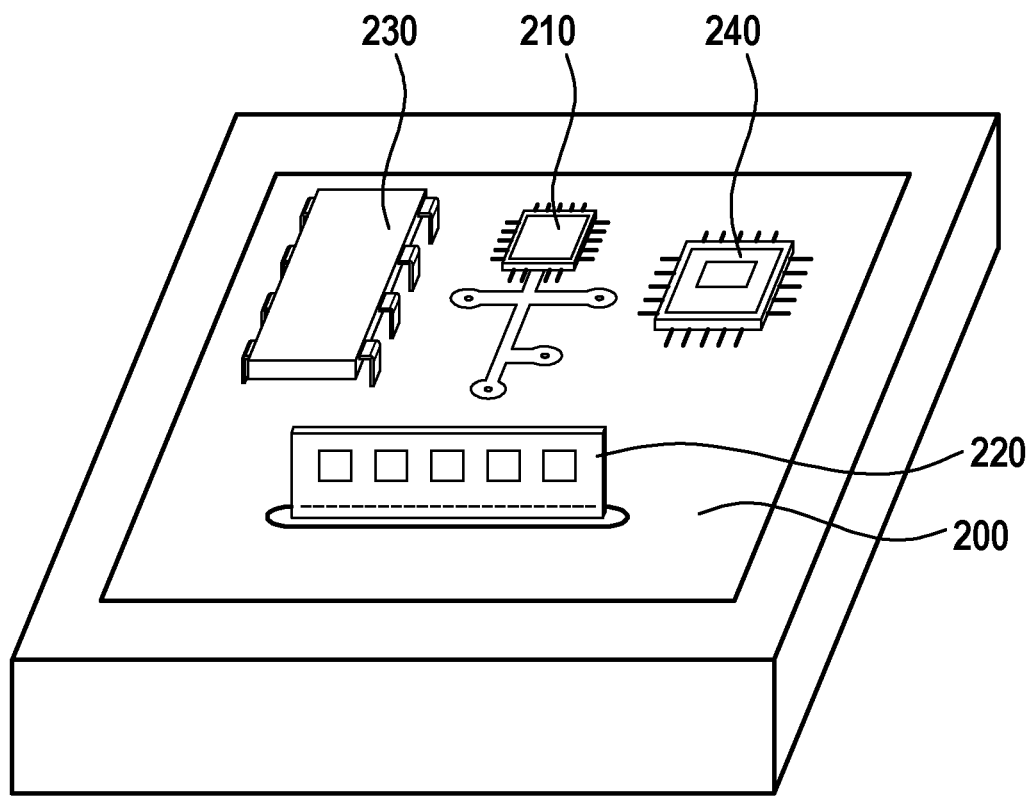
FIG. 2 illustrates an electronic device according to an example embodiment of the present invention.

FIG. 2 illustrates an electronic device 200 according to the present invention (for example, the first electronic device, the second electronic device, or the further electronic devices).

Electronic device 200 includes a processor 210. In addition, electronic device 200 includes a volatile memory 220. The electronic device may also include a firmware component 230. In some examples, the update information of the present invention pertains to the firmware component (in particular with regard to the second electronic device). In addition, the electronic device may include a trusted system 240. The trusted system may take over portions of the validation operations and/or the storage and management of cryptographic elements (keys, for example) described herein. In some examples, trusted system 240 may be a hardware security module (HSM), which is an internal or external peripheral device for the efficient and secure carrying out of the cryptographic operations or applications. In other examples, the trusted system may be a trusted platform module (TPM), i.e., a cryptoprocessor that enhances electronic device 240 with security functions (for example, the validation operations and/or the storage and management of cryptographic elements described herein).

In some examples, the first and the second electronic device may have the same design (for example, as shown in FIG. 2). However, in some examples the first electronic device has a higher computing power than the second electronic device (for example, for the task of validating signatures). In some cases, the first electronic device may carry out more than ten times as many computing operations (for example, more than 100 times as many computing operations) per time period as the second electronic device. In some examples, the first electronic device may validate a certain PQA signature more quickly than the second electronic device (for example, ten times as fast or faster). In some examples, the first electronic device may validate a certain PQA signature when the performance of the second electronic device is not adequate for this purpose. In some cases, the validation of a certain PQA signature using the second device may last one minute or longer (for example, five minutes or longer) if no hardware acceleration is used.

Additionally or alternatively, the first electronic device may include more volatile memory than the second electronic device (for example, for the task of validating signatures). In some cases, the first electronic device may include over ten times as much volatile memory (for example, over 100 times as much volatile memory) as the second electronic device.

The higher performance (for example, in the form of greater computing power and/or more volatile memory) of the first electronic device in comparison to the second electronic device may make it possible to distribute the tasks according to the present invention. The first electronic device on the one hand may carry out (relatively) complex computing operations for validating PQA signatures, and on the other hand may be equipped to execute further (future) signature algorithms.

Aspects of the systems in which the techniques of the present invention may be used are explained below with reference to FIGS. 3 and 4.

Moreover, the present invention relates to a system that includes a first electronic device and a second electronic device, each of which carries out steps of the present invention pertaining to the first or second electronic device. The first and second electronic devices are connected in a first network.

In some examples, the second electronic device is a control unit for a device, for example a dedicated control unit for the device. The device may be a vehicle, a robot, a household appliance, an industrial facility, or an industrial machine. Accordingly, the first network may be an electrical system of a vehicle, a home or building network (of a "smart home," for example), or a local network of an industrial facility or industrial machine. In these examples and also in general, the second electronic device may be an embedded system.

The first electronic device may be a central communication node of the first network. For example, the first electronic device may be a central communication node of a vehicle, of a home or building network (a smart home network, for example), or of an industrial facility.

The first electronic device may be situated at an edge of the first network (i.e., at the transition of the first network to a second network). In other examples, the first electronic device may be situated within the first network (i.e., the communication with nodes/data sources situated outside the network takes place via a further node of the first network).

The first electronic device may be a mobile telephone, a laptop, or a PC. The first electronic device may be designed for a shorter service life than the second electronic device. In some examples, the first electronic device or one of its components may be replaced, while the hardware of the second electronic device remains unchanged. For example, at a certain point in time a new mobile telephone, a new laptop, or a new PC may be integrated into the first network in order to take over the tasks of the first electronic device.

In some examples, the first electronic device may receive the update information for the second electronic device (for example, from a source of the update information), using a first communication channel. The relaying of the update information to the second electronic device may include the use of a second communication protocol, which is different from the first communication protocol, over the first network. The first communication protocol may be a communication protocol over an air interface, and/or the second communication protocol may be a communication protocol of a local data network. In some examples, the update information may be received from a remote network node (as a data source), in particular with the aid of a wide area network. The first network may be a local data network, in particular a wireless local data network and/or a local bus network.

Aspects of the systems are explained in greater detail below.

Figure 3:
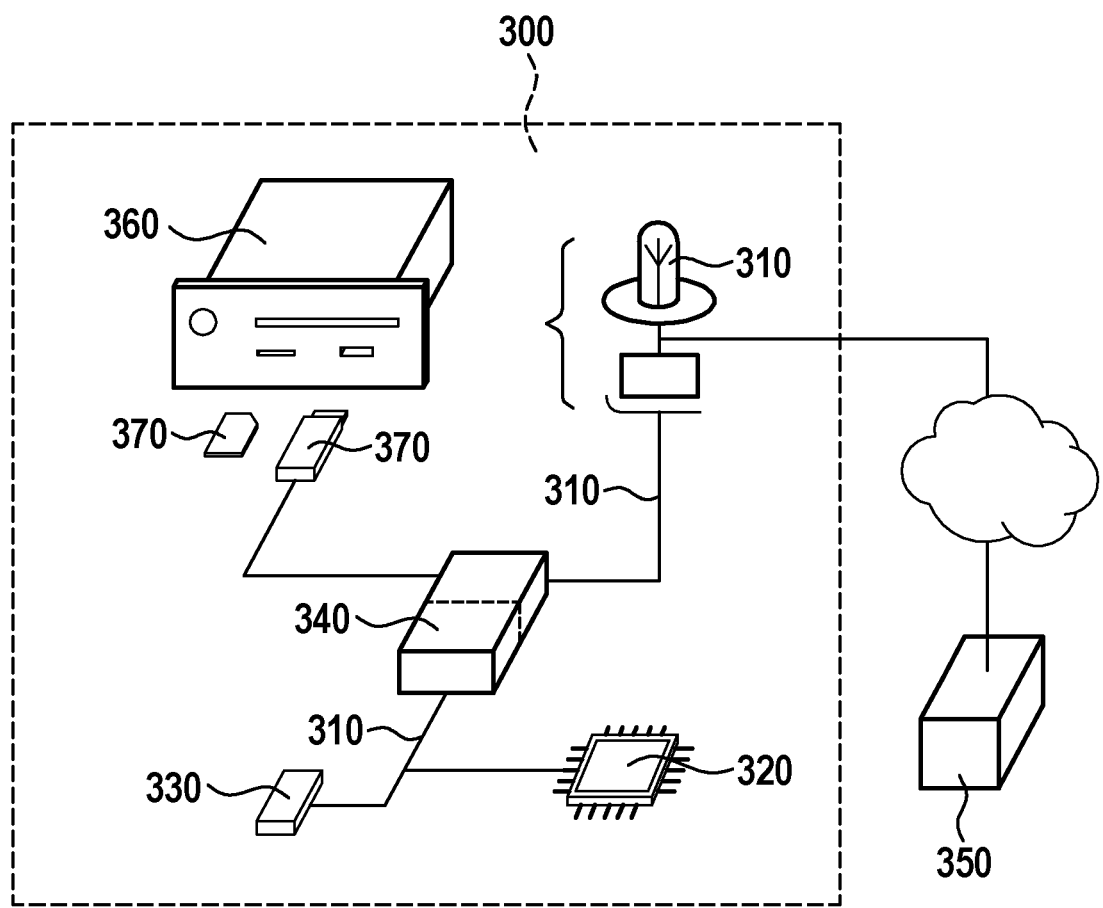
FIG. 3 shows a network of a vehicle in which a system according to an example embodiment of the present invention is used.

FIG. 3 shows a network of a vehicle 300 in which a system according to the present invention is used.

Vehicle 300 may be a motor vehicle (for example, a motor vehicle that operates at least semi-autonomously). In other examples, the vehicle may be a ship, a train, an aircraft, or a spacecraft. The vehicle may be any vehicle that is designed for transporting passengers and/or cargo.

The first network may be an electrical system 310 of vehicle 300, which may be any suitable local data network. For example, electrical system 310 may be a bus network (CAN, LIN, MOST, FlexRay, or Ethernet, for example). In other cases, electrical system 310 of vehicle 300 may be a wireless local area network (for example, a Wi-Fi network, a Bluetooth network, or some other wireless local area network). Electrical system 310 may also include various networks, each of which connects devices and components (and which are connected to one another). For example, electrical system 310 (i.e., the first network) may include a CAN bus as well as a wireless local area network.

Vehicle 300 contains one or multiple second electronic devices 320, 330 (for the purpose of illustration, FIG. 3 shows two second electronic device 320, 330; in other cases, vehicle 300 contains more than two, more than five, or more than ten second electronic devices according to the present invention). Second electronic devices 320, 330 may be designed to carry out the steps described herein. The one or multiple second electronic devices 320, 330 may be electronic control units (ECUs) 320, 330. The control units may be designed to control, regulate, and/or monitor various functions of vehicle 300 (and for this purpose may be coupled to corresponding sensors and/or actuators). For example, the control units may include an engine control unit 320.

Vehicle 300 may include a first electronic device in the form of a central communication node 340. Central communication node 340 may function as a data distributor for the communication within vehicle 300, and for communication with the outside world via a communication interface. Central communication node 340 [may] support different bus systems (CAN, LIN, MOST, FlexRay, or Ethernet, for example).

In some examples, the first electronic device is integrated directly into a second network. In other examples, the first electronic device may be connected to a further component in electrical system 310, the further component being integrated into the second network. In contrast, in the example in FIG. 3, the first electronic device in the form of central communication node 340 is connected to a data source.

In some examples, the second network may be a mobile radio communications network. The second network may include an air interface. In some examples, vehicle 300 may be supplied with update information during operation (via an air interface, for example).

The data source may be an Internet server 350 or some other remote network component. Vehicle 300 (or central communication node 340) may be connected to Internet server 350 or to the other remote network component via suitable network components 370 in the vehicle and outside the vehicle.

Alternatively or additionally, the data source may be a head unit 360 of a system of vehicle 300 (for example, an infotainment system of vehicle 300). Head unit 360 may be integrated into the second network. In other examples, head unit 360 may be equipped with an interface for a data medium 370 (an USB interface, for example), which may be used as a data source. In other examples, other components of vehicle 300 are equipped with an interface for a data medium (a USB interface, for example), which may be used as a data source.

Also alternatively or additionally, the data source may be a mobile electronic device (not shown in FIG. 3) that is situated in vehicle 300 and in electrical system 310 of the vehicle. For example, a mobile telephone or a laptop (for example, of a passenger of the vehicle) may be used as a data source.

In the example in FIG. 3, update information may now be obtained from one of the data sources (for example, for a firmware component of control units 320, 330 or some other second electronic device). This may be provided with a PQA signature, which is validated by central communication node 340 and optionally relayed to one of control units 320, 330 or other second electronic devices (optionally using the further techniques of the present invention).

Software components and in particular firmware components of vehicle 300 may be updated in this way, it still being possible to ensure that the update information may be validated using up-to-date and secure signatures. This may be advantageous in particular for vehicles that in many cases are designed for a service life of more than ten years (in some cases significantly longer).

The system shown in the example in FIG. 3 may be varied in different ways in further examples. Thus, in some examples, instead of a central communication node 340, some other component may be the first electronic device according to the present invention. In some examples, a mobile electronic device (a laptop or mobile telephone, for example) situated in electrical system 310 of the vehicle may be the first electronic device according to the present invention. In yet other examples, head unit 360 of a system of vehicle 300 (for example, an infotainment system of vehicle 300) may be the first electronic device according to the present invention.

Further examples of systems according to the present invention are provided below. FIG. 4 shows a network 410 in a household or building 400 in which a system according to the present invention is used (the first network in the example in FIG. 4).

Network 410 in a household or building 400 may be a local area network. In some cases, the local area network contains a wireless local area network (for example, a Wi-Fi network or a Bluetooth network or some other wireless local area network).

In network 410 in a household or building 400, electronic devices that function as a first electronic device according to the present invention may be connected. This may be, for example, a computer 420 (a laptop or a PC, for example) and/or a mobile electronic device 430 (a mobile telephone, for example) situated in the household or building. Computer 420 and/or mobile electronic device 430 may be connected to a second network via suitable network components 440. For example, network components 440 may include an Internet router 440 that establishes a connection of network 410 in a household or building 400 to the Internet (the second network). Network components 440 may include any component that may be integrated into a wide area network or connected to a wide area network via components connected in between.

Figure 4:
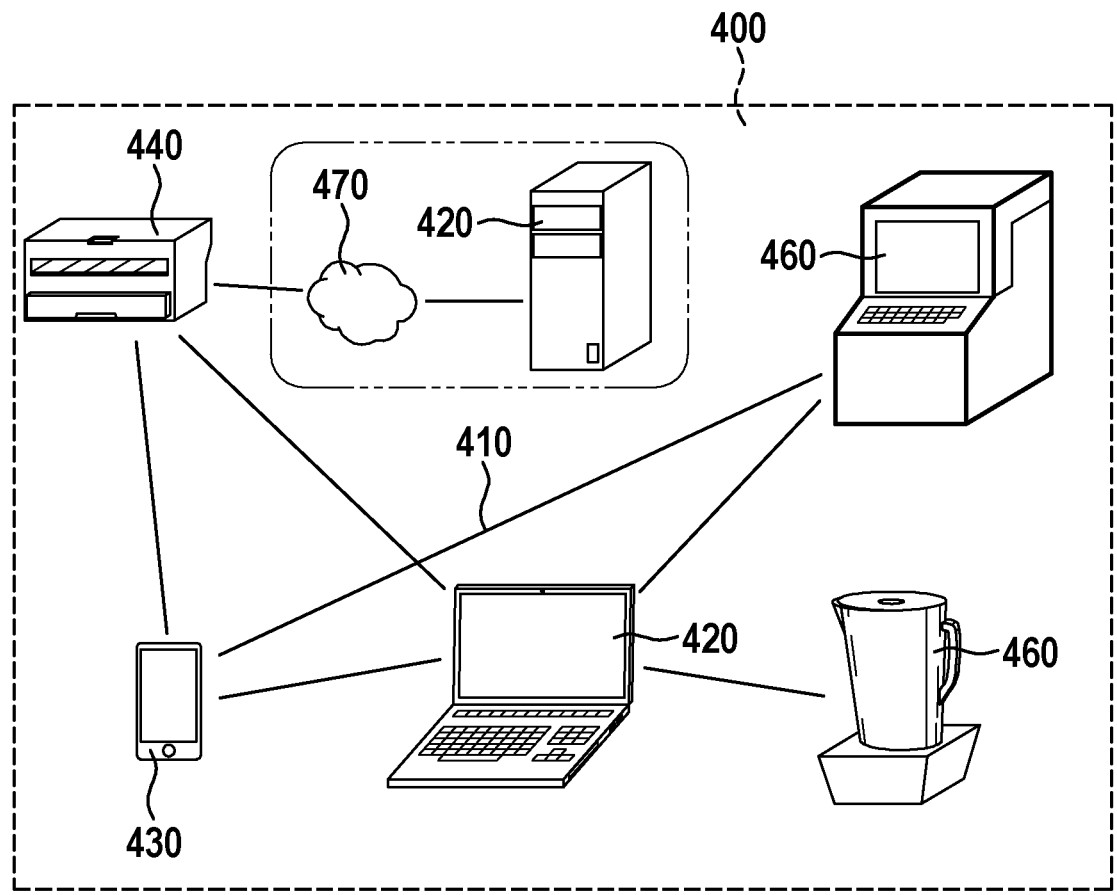
FIG. 4 shows a network in a household, in which a system according to an example embodiment of the present invention is used.

In the example in FIG. 4, Internet router 440 is connected to a remote data source 480 via the Internet 470 (or some other suitable wide area network), which thus is not part of building/household 400. Remote data source 480 may be an Internet server, for example.

In network 410 in a household or building 400, one or multiple second electronic devices 450, 460 may also be connected (two electronic devices in the example in FIG. 4; in other cases, network 410 in a household or building 400 contains more than two, more than five, or more than ten second electronic devices according to the present invention). Second electronic devices 450, 460 include any electronic devices that include software components (and in particular firmware components) that may be updated. Second electronic devices 450, 460 may be household appliances. In some examples, second electronic devices 450, 460 may include one or multiple kitchen appliances (a blender 450 is shown in the example in FIG. 4), consumer electronics devices (for example, televisions, speakers, set-top boxes, stereo systems, and other consumer electronics devices), electric tools (for example, garden tools, hand-held power tools, measuring devices), toys, electronic personal care devices (for example, scales, shavers, toothbrushes, and other electronic care devices), and smart home components (for example, lamps, cameras, doorbells, sensors, and other smart home components). A certain electronic device may fall into multiple of the preceding categories. A smart home component may be an electronic device that controls, regulates, and/or monitors a function of a building or a device situated in the building (in particular in the form of a dedicated control unit for the function of the building or the device situated in the building).

Stated second electronic devices 450, 460 (household appliances, for example) may include fewer hardware resources compared to computers 420 or mobile electronic devices 430 that are also connected in network 410 in a household or building 400 (as mentioned above).

Update information for the one or multiple second electronic devices 450, 460 (for example, for firmware components of second electronic devices 450, 460) may be received with the aid of the first electronic device (for example, computer 420 or mobile electronic device 430).

The same as in the example in FIG. 3, the devices situated in network 410 in a household or building 400 may be securely provided with update information using the techniques of the present invention. In particular networked household appliances often include only very limited hardware resources, so that complex validation operations for signatures are difficult to implement.

The system shown in the example in FIG. 4 may be varied in different ways in further examples. Thus, in some examples, instead of a computer 420 or mobile electronic device 430, some other component may be the first electronic device according to the present invention. In some examples, an Internet router 440 or some other component at the edge of the first network (network 410 in household or building 400) may be the first electronic device according to the present invention.

The techniques of the present invention may also be used in industrial facilities. The industrial facilities may include manufacturing plants, facilities for installing or assembling products, inspection facilities, facilities for sorting and/or transporting products, and/or other industrial facilities. In some examples, the industrial facility may include one or multiple industrial machines (machine tools, for example).

The same as in the examples in FIGS. 3 and 4, an industrial facility may include a first network (a local area network, for example). Various electronic devices may be connected in the first network of the industrial facility. For example, the industrial facility may include one or multiple control units that control, regulate, or monitor the functions of the industrial facility. These electronic devices may be the second electronic devices of the present invention, whose software components are to be updated.

In addition, the industrial facility may include one or multiple electronic devices that may function as a first device according to the present invention. In some examples, the first device may be a central communication node of the industrial facility. Additionally or alternatively, the first electronic device may be a computer (a laptop or a PC, for example) and/or a mobile electronic device (a mobile telephone, for example) that is situated in the network of the industrial facility.

Update information for the one or multiple second electronic devices of the industrial facility (for example, for firmware components of the second electronic devices) may be received with the aid of the first electronic device (for example, a computer or mobile electronic device).

In addition, electronic devices of industrial facilities are in some cases equipped with easily manageable hardware resources and/or designed for very long service lives. Industrial facilities may be securely provided with update information with the aid of the method of the present invention.

Moreover, the present invention relates to a computer program that is configured to carry out all steps of the method of the techniques of the present invention. Furthermore, the present invention relates to a machine-readable memory medium or signal on which the computer program of the present invention is stored or encoded, respectively.

What is claimed is:

1. A method for updating a software component, comprising:
providing a first electronic device and a second electronic device that are connected in a first network;
receiving update information for the second electronic device via the first electronic device, the update information being provided with a signature that is generated using a post-quantum algorithm (PQA) signature;
checking the update information by validating the PQA signature by the first electronic device;
relaying the update information to the second electronic device when the update information is deemed to be valid; and
updating a software component of the second electronic device, using the update information, wherein the post-quantum algorithm is a first post-quantum algorithm, and the method further comprises:
receiving update information for the first electronic device, which includes pieces of information that enable the first electronic device to validate a signature of a second post-quantum algorithm that differs from the first post-quantum algorithm; and
updating the first electronic device using the update information for the first electronic device.

2. The method as recited in claim 1, wherein the first electronic device has a higher computing power than the second electronic device.

3. The method as recited in claim 1, wherein the second electronic device is a dedicated control unit for a device, the device being a vehicle or a robot or a household appliance or an industrial facility or an industrial machine.

4. The method as recited in claim 1, wherein the second electronic device is an embedded system.

5. The method as recited in claim 1, wherein the first electronic device is a central communication node of the first network, the central communication node being a central communication node of a vehicle, or of a network in a household or building or an industrial facility, or the first electronic device is a mobile telephone or a laptop or a personal computer (PC).

6. The method as recited in claim 1, wherein the first network is a local data network, the local data network being a wireless local data network and/or a local bus network.

7. The method as recited in claim 1, wherein the update information is received from a remote network node using a wide area network.

8. The method as recited in claim 1, wherein the first electronic device is paired with the second electronic device, the first electronic device and the second electronic device sharing a cryptographic shared secret, and the method further comprises:
using the cryptographic shared secret for relaying the update information to the second electronic device.

9. The method as recited in claim 1, further comprising:
removing a portion of the update information and/or of the PQA signature by the first electronic device.

10. The method as recited in claim 1, wherein the update information contains a firmware update for the second electronic device, the update information that is relayed to the second electronic device containing executable code for the second electronic device.

11. The method as recited in claim 1, wherein the first electronic device is connected to at least one further electronic device in the first network, and the method further comprises:
updating a software component of the at least one further device, using the method.

12. An electronic device configured to update a software component, the electronic device being connected to a second electronic device in a first network, the electronic device configured to:
receive update information for the second electronic device, the update information being provided with a signature that is generated using a post-quantum algorithm (PQA) signature;
check the update information by validating the PQA signature by the first electronic device; and
relay the update information to the second electronic device when the update information is deemed to be valid;
wherein a software component of the second electronic device is updated using the update information, wherein the post-quantum algorithm is a first post-quantum algorithm, and the electronic device is further configured to:
receive update information for the first electronic device, which includes pieces of information that enable the first electronic device to validate a signature of a second post-quantum algorithm that differs from the first post-quantum algorithm; and
update the first electronic device using the update information for the first electronic device.

13. A system, comprising:
an first electronic device;
a second electronic device, the first electronic device being connected to the second electronic device via a first network;
wherein the first electronic device is configured to:
receive update information for the second electronic device, the update information being provided with a signature that is generated using a post-quantum algorithm (PQA) signature,
check the update information by validating the PQA signature by the first electronic device, and
relay the update information to the second electronic device when the update information is deemed to be valid; and
wherein the second electronic device is configured to update a software component using the update information, wherein the post-quantum algorithm is a first post-quantum algorithm, and the first electronic device is further configured to:
receive update information for the first electronic device, which includes pieces of information that enable the first electronic device to validate a signature of a second post-quantum algorithm that differs from the first post-quantum algorithm; and
update the first electronic device using the update information for the first electronic device.

* * * * *